(12) United States Patent
Harris

(10) Patent No.: US 11,618,849 B2
(45) Date of Patent: Apr. 4, 2023

(54) SHALE TREATMENT

(71) Applicant: CLEANSORB LIMITED, Guildford (GB)

(72) Inventor: Ralph Edmund Harris, Guildford (GB)

(73) Assignee: CLEANSORB LIMITED, Guildford (GB)

( * ) Notice: Subject to any disclaimer, the term of this patent is extended or adjusted under 35 U.S.C. 154(b) by 319 days.

(21) Appl. No.: 16/311,550

(22) PCT Filed: Jun. 15, 2017

(86) PCT No.: PCT/GB2017/051749
§ 371 (c)(1),
(2) Date: Dec. 19, 2018

(87) PCT Pub. No.: WO2017/220973
PCT Pub. Date: Dec. 28, 2017

(65) Prior Publication Data
US 2019/0194527 A1 Jun. 27, 2019

Related U.S. Application Data

(63) Continuation-in-part of application No. 15/191,858, filed on Jun. 24, 2016, now abandoned.

(51) Int. Cl.
| | | |
|---|---|---|
| *C09K 8/68* | (2006.01) | |
| *C09K 8/72* | (2006.01) | |
| *E21B 43/26* | (2006.01) | |
| *C09K 8/60* | (2006.01) | |
| *C09K 8/62* | (2006.01) | |

(52) U.S. Cl.
CPC ............... *C09K 8/68* (2013.01); *C09K 8/607* (2013.01); *C09K 8/62* (2013.01); *C09K 8/72* (2013.01); *C09K 2208/12* (2013.01)

(58) Field of Classification Search
None
See application file for complete search history.

(56) References Cited

U.S. PATENT DOCUMENTS

| | | |
|---|---|---|
| 3,481,398 A | 12/1969 | Prats |
| 5,277,796 A | 1/1994 | Chao |
| 6,702,023 B1 | 3/2004 | Harris et al. |
| 6,763,888 B1 | 7/2004 | Harris et al. |
| 7,021,377 B2 | 4/2006 | Todd et al. |
| 7,726,404 B2 | 6/2010 | Kubala et al. |
| 7,784,545 B2 | 8/2010 | Maguire |
| 7,828,057 B2 | 11/2010 | Kearl et al. |
| 8,371,382 B2 | 2/2013 | Dusterhoft et al. |
| 8,485,257 B2 | 7/2013 | Bali et al. |
| 8,701,766 B2 | 4/2014 | James |
| 8,733,439 B1 | 5/2014 | Bakshi |
| 8,752,627 B2 | 6/2014 | Hartman et al. |
| 9,347,301 B2 | 5/2016 | Gao et al. |
| 9,771,785 B2 | 9/2017 | Nguyen et al. |
| 2004/0106525 A1 | 6/2004 | Willberg et al. |
| 2004/0163814 A1 | 8/2004 | Todd et al. |
| 2004/0163874 A1 | 8/2004 | Rinklin |
| 2006/0058197 A1 | 3/2006 | Brown et al. |
| 2009/0029880 A1 | 1/2009 | Berry et al. |
| 2010/0252267 A1 | 10/2010 | Harris et al. |
| 2011/0083849 A1* | 4/2011 | Medvedev .............. C09K 8/665 166/280.1 |
| 2012/0285692 A1 | 11/2012 | Potapenko et al. |
| 2013/0333892 A1 | 12/2013 | McClung, IV |
| 2014/0034320 A1 | 2/2014 | Ladva et al. |
| 2015/0075782 A1 | 3/2015 | Sharma |
| 2016/0076352 A1 | 3/2016 | Nguyen et al. |
| 2016/0108307 A1 | 4/2016 | Nguyen et al. |
| 2016/0145483 A1 | 5/2016 | Lecerf et al. |
| 2016/0145486 A1 | 5/2016 | Weaver et al. |

FOREIGN PATENT DOCUMENTS

| | | |
|---|---|---|
| EA | 15915 B1 | 12/2011 |
| GB | 1468033 | 3/1977 |
| RU | 2494239 C2 | 9/2013 |
| WO | WO 2012/113738 | 8/2012 |
| WO | WO 2015/041678 | 3/2015 |
| WO | WO 2016/010548 | 1/2016 |
| WO | WO 2016/108877 | 7/2016 |

OTHER PUBLICATIONS

Abrams et al. "Higher-pH Acid Stimulation Systems," *Journal of Petroleum Technology*, 35(12), 2175-2184, 1983.
Apaydin, O.G. et al. "Effect of Discontinuous Microfractures on Ultratight Matrix Permeability of a Dual-Porosity Medium", CSUG/SPE 147391, 19 pages, 2011.
Chong K.K. et al., "A completions guide book to shale-play development: A review of successful approached towards shale-play stimulation in the last two decades" CSUG/SPE 133874, 2010.
"DEEPA: 65% increase in Estimated Ultimate Recoverables (EUR) in a dual lateral well in Austin Chalk" (case study from Cleansorb Limited's website: http://www.cleansorb.com/wp-content/uploads/2012/04/Cleansorb-DEEPA-Austin-Chalk-Texas.pdf) (2012).
Fontaine et al., (2008) "Design, Execution, and Evaluation of a "Typical" Marcellus Shale Slickwater Stimulation: A Case History", SPE-117772-MS presented at SPE Eastern Regional/AAPG Eastern Section Joint Meeting, Pittsburgh, Pennsylvania, USA, Oct. 11-15, 2008.
Ewy et al., "Shale Swelling Tests Using Optimized Water Content and Compaction Load", SPE 121334, 18 pages, 2009.
Grieser et al., "Surface Reactive Fluid's Effect on Shale," *SPE International*, 2007; 3:1-7.
International Search Report and Written Opinion issued in Application No. PCT/GB2017/051749, dated Aug. 23, 2017.
Hart, "The Calcites of Shale Plays: Why Moving Beyond Quantitative Mineralogy Will Improve Project Economics", URTeC 1934552-MS, (2014).

(Continued)

*Primary Examiner* — Charles R Nold
(74) *Attorney, Agent, or Firm* — Norton Rose Fulbright US LLP

(57) ABSTRACT

A treatment fluid and process for enhancing hydrocarbon production from a shale formation using a treatment fluid comprising a water soluble delayed release carbonate-dissolving agent and introducing the treatment fluid into the shale formation after or as part of a hydraulic fracturing process.

16 Claims, No Drawings

(56) References Cited

OTHER PUBLICATIONS

Jacobs, Journal of Petroleum Technology article, EOR-For-Shale, pp. 28-31, Jun. 2016.
Manchanda et al., "Time-Dependent Fracture-Interference Effects in Pad Wells", SPE Prod and Oper 29(04):274-287. SPE-164534-PA, 2014.
Meyer et al., "Enhanced Dissolution of Oil Shale by Bioleaching with Thiobacilli", Applied and Environmental Microbiology vol. 32, No. 4, pp. 610-616, 1976.
Morsy et al., "Potential of Improved Waterflooding in Acid-Hydraulically-Fractured Shale Formations", SPE 166403, (2013).
Morsy, et al., "Improving Hydraulic Fracturing of Shale Formations by Acidizing" Society of Petroleum Engineers, SPE 165688 dol: 10.2118/165688-MS (Aug. 20, 2013).
Sheng J. et al., "Matrix Acidizing Characteristics in Shale Formations" J Pet Environ Biotechnol, 5(5): 1000194, 2014.
Wu and Sharma "Acid Fracturing in Shales: Effect of Dilute Acid on Properties and Pore Structure of Shale", SPE 1773390, SPE Production & Operations, 13 pages, 2016.
Zitha et al. "Increasing Hydrocarbon Recovery Factors", Society of Petroleum Engineering, Accessed online, URL: http://www.spe.org/industry/increasing-hydrocarbon-recovery-factors.php, date of Access: Jul. 14, 2016.
Search Report dated Jun. 8, 2020 issued in corresponding Russian Patent Application No. 2018145770.

* cited by examiner

SHALE TREATMENT

This application is a national phase under 35 U.S.C. § 371 of International Application No. PCT/GB2017/051749, filed Jun. 15, 2017, which claims the benefit of priority to U.S. patent application Ser. No. 15/191,858, filed Jun. 24, 2016. The contents of each of the referenced applications are incorporated into the present application by reference.

TECHNICAL FIELD

The present technology relates to a process for enhancing hydrocarbon production from a shale formation. In particular, the present technology relates to a process wherein a treatment fluid comprising a water soluble, delayed release carbonate-dissolving agent is introduced into the shale formation after or as part of a hydraulic fracturing process. The present technology also relates to a treatment fluid that can be used in such a process.

BACKGROUND

Production of gas or oil from very low permeability formations (shale gas and shale oil) defined herein as shale formations, has become increasingly important in recent years.

In the context of the present invention "shale oil" refers to crude oil in oil-bearing shales. The International Energy Agency recommends use of the term "light tight oil" and the World Energy Council uses the term "tight oil" for crude oil in oil-bearing shales. The term "shale oil" is also commonly used to refer to oil produced from oil shale by pyrolysis, hydrogenation, or thermal dissolution.

Shale formations bearing oil and gas are regarded as very low permeability formations. In general terms, shale gas plays may be defined as ultratight source rocks with permeabilities of 1-100 nanodarcies and shale oil plays, such as the Bakken and Eagle Ford, may be defined as very tight reservoirs with permeabilities of 1-10 microdarcies.

By contrast, conventional oil plays such as the Permian and Austin Chalk have permeabilities from 10 microdarcies to 1 millidarcy and are termed tight oil plays. Most conventional oil and gas field have permeabilities in the range 1-100 millidarcies.

Typical porosities for shale plays are in the range 3-10% for gas shales and 5-10% for oil shales. This compares to typical porosities in conventional oil and gas reservoirs of 10-15%. There are thus substantial differences between shale gas and oil plays and conventional oil and gas fields.

Very low permeability shale gas and shale oil formations cannot be produced at economic rates using conventional well technology. Economic production from such shales has only been achieved through the development and successful application of effective hydraulic fracturing techniques.

Once the permeability has been sufficiently increased by fracturing, primary production is possible, leading to the possibility of secondary production and enhanced oil recovery (EOR) at a later stage.

Recovery factors for shale plays are rather low. For example, for shale gas, the recovery factor for the Barnett shale is estimated to be about 6.1% and for the Marcellus about 9.3%. For shale oil, the recovery factor for the Eagle Ford shale is estimated at 1.7%. An estimated average recovery rate of 7% from horizontal shale wells is far short of the 40% recovery rate typically achieved through primary and secondary (waterflooding) production in conventional reservoirs (Journal of Petroleum Technology article, EOR for Shale, June 2016 pp 28-31). While re-fracturing has been suggested as an option to improve ultimate recovery, such operations remain expensive and may only temporarily reset production to initial rates once or twice in a well's life (Journal of Petroleum Technology article, EOR for Shale, June 2016 pp 28-31).

Modelling indicates that microfractures intersected by the macrofracture network may enhance the local flow capacity and fluid transfer from matrix to macrofracture (Apaydin, O. G. et al (2011) *CSUG/SPE 147391 Effect of Discontinuous Microfractures on Ultratight Matrix Permeability of a Dual-Porosity Medium*). Microfractures may therefore significantly contribute to the production performances of multiple fractured horizontal wells in ultratight, very tight, or other low permeability formations.

The contribution of microfractures to production is evident from the fact that to history match the production response of shale oil and gas wells, it is always necessary to introduce a stimulated rock volume (SRV), a region of high permeability around the main propped fracture, to obtain a good match. Microseismic mapping also shows that shear-failure events usually occur both near and some distance away from the propped fracture (SPE 1773390). The increase in permeability in the SRV is a direct result of the creation of induced un-propped fractures (IU fractures) in the rock.

Over time, as the well is produced and fluid leaks off from IU fractures, their width and conductivity may fall to near zero. (Manchanda, R., Sharma, M. M., and Holzhauser, S. 2014. Time-Dependent Fracture-Interference Effects in Pad Wells. SPE Prod and Oper 29(04):274-287. SPE-164534-PA).

Shales usually have natural microfractures and HCl or HF acidizing may be used to dissolve carbonate or silicate components of the shale and increase microfracture conductivity (Sheng J. et al., J Pet Environ Biotechnol (2014) 5: 194. Matrix Acidizing Characteristics in Shale Formations; Morsy S et. Al. (2013) SPE 166403 Potential of Improved Waterflooding in Acid-Hydraulically-Fractured Shale Formations).

In an investigation of the effects of reactive fluids on shale, it was observed that reactive fluids seem to remove soluble minerals in the shale, exposing pits and microfractures. Increasing the access to microporosity and/or natural fractures as well as increased surface area was believed to enhance production from shale formations (SPE 106815 Surface Reactive Fluid's Effect on Shale. Grieser, B. et al.).

Conventional acid fracturing of carbonate formations aims to achieve non-uniform etching of the fracture faces of a carbonate formation. Most carbonate formation have a very high solubility in acid.

If acid treatments are applied to shales, the distribution and structure of the carbonate before a treatment will determine the microstructure and pore structure after treatment. SPE 173390 investigated carbonate in Bakken shale and determined that carbonate (calcite and dolomite) was present with four distribution patterns. These were: (a) carbonate rich regions with area more than 100×100 microns, containing mostly fine-grained limestone muds or associated with calcite precipitation in natural fractures; (b) carbonate grains or islands with dimensions of approximately 10 to 30 microns; (c) carbonate rings at the rim of quartz or clay grains or clusters of grains with dimensions of 10 to 30 microns; and (d) finely mixed siliceous and carbonate grains. Non-uniform etching of fracture faces in shale depends greatly on the distribution of carbonate minerals within the shale and the access that acid has to carbonates.

Heterogeneity therefore plays an important role in this non-uniform etching. The paper concluded that in acid fracturing, the non-uniformity of the etched pattern arising from carbonate dissolution is a function of the heterogeneity in the shale at many different length scales and is difficult to replicate in a laboratory experiment. The acidized shale matrix immediately adjacent to the fracture face, with significantly increased permeability and porosity, may also serve as preferred channels to enhance hydrocarbon flow.

At the core scale, it has been shown that acidizing with HCl to dissolve carbonate in cores can significantly increase recovery factors that could be obtained from water flooding as a secondary recovery method. Treatment of Eagle Ford, Mancos, Barnet, and Marcellus shale cores using 1-3% w/v hydrochloric acid (HCl) indicated that dissolving carbonate with HCl may increase the permeability and porosity of the cores and also increase oil recovery factors from spontaneous imbibition by between 2 and 13 fold (Sheng J. et al., J Pet Environ Biotechnol (2014) 5: 194. Matrix Acidizing Characteristics in Shale Formations).

A relatively low acid dose can have a significant effect on the oil recovery factor from cores, and more than one mechanism may be involved. For example, although increase in porosity of Eagle Ford shale correlated well with carbonates dissolution, increase in porosity of Barnett, Mancos, and Marcellus shale samples (where an acid treatment was also applied to dissolve carbonate) was correlated with the development of cracks (Morsy S et. Al. (2013) SPE 166403 Potential of Improved Waterflooding in Acid-Hydraulically-Fractured Shale Formations). The same paper reports that treatment with HCl was observed to have the potential to significantly reduce the mechanical strength of shales. Reductions in unconfined compressive strength of the order of 50-60% were observed for Mancos and Eagle Ford shales. Too much of a reduction of the mechanical strength could potentially have deleterious effects on production.

SPE-2014-1934552-MS discloses that the amount of carbonate, by itself, is not enough information to predict the likely importance of these minerals for reservoir and completions quality. This paper recognises four principle types of calcite: Pelagic, carbonate event beds, benthic carbonates, and diagenetic calcites. Diagenetic calcites (pore filling cements, fracture fills, replacements, etc.) are present to varying degrees in perhaps most source-rock (shale) plays.

Removal of carbonate from oil shale using bioleaching with *Thiobacillus*, which generates sulphuric acid, followed by retorting, was observed to increase oil yield by 40 to 60%. (Meyer, W. G. & Yen, T. F. (1976). Enhanced Dissolution of Oil Shale by Bioleaching with Thiobacilli. Applied and Environmental Microbiology Vol. 32, No. 4, pp 610-616). Although oil is extracted from such shales by heating, this result suggests that carbonate minerals present in at least some types of oil shale may shield access to oil, and removal of carbonate can increase oil yield on heating. The process described by Meyer & Yen requires oxygen to generate sulphuric acid. It may be applied to oil shale extracted to the surface, bioleached and then heated. It would not be suitable for acid treatment of underground shale formations.

Treatment of shale formations with hydrochloric acid has typically been limited to the use of hydrochloric acid as a pre-flush for hydraulic-fracturing processes or as other substages of the hydraulic fracturing process (Morsy S et. Al. (2013) SPE 166403 Potential of Improved Waterflooding in Acid-Hydraulically-Fractured Shale Formations).

US2015/0075782 discloses that the permeability of mudstones including shales may be enhanced using fracturing in combination with an acid treatment using hydrochloric, formic, or acetic acid at 5 to 28% by weight. However, US2015/0075782 also points out significant drawbacks to the use of reactive acids. It suggests that acid may dissipate into the formation and not reach the end of the formation and/or dissolve more of the formation than is desired. Further, the rapid reaction rate of the acidizing fluid with those portions of the formation with which it first comes into contact can mean it does not penetrate into the formation. The end result is that the acid becomes spent before it penetrates into the formation a significant distance from the fracture.

WO2016010548 discloses use of encapsulated mineral acids, Lewis acids, or acid precursors for etching of the faces of fractures in a shale formation. The rapid reaction of inorganic or organic acids is exacerbated by the relatively high temperatures of around 100° C. or higher that are typical of many shale formations.

Although acidizing with HCl at 1-3% has been shown to be effective for dissolving carbonate and increasing the recovery factor from cores of shale, achieving uniform penetration of an HCl treatment fluid into microfractures to dissolve carbonate at any significant distance from the point of injection of the acid is problematic.

It is likely that the near wellbore region will receive a very high total dose of "live" HCl and parts of the formation far from the injection point will only contact a "spent" acid solution. Parts of the formation that encounter an effective high dose of HCl may have their mechanical strength significantly reduced and parts of the formation that encounter spent HCl will not have their carbonate removed.

In addition to these technical limitations, inclusion of large volumes of reactive acid in fracturing treatments makes the treatments more hazardous with health and safety and environmental implications.

U.S. Pat. No. 3,481,398 discloses the use of aliphatic monohalide precursors, such as allyl chloride (3-Chloropropene) to generate inorganic acids such as HCl in-situ, for the purpose of increasing the permeability of underground shale formations before fracturing, for example by dissolving tuffaceous streaks before fracturing.

WO2015041678 refers to a perceived need for methods of etching the fracture faces of fractures and microfractures in shale formations to enhance production without the use of a propping agent, and in this context describes a method for etching such fractures and microfractures using particles of at least one of a hydrolysable in-situ acid generator and a hydrolysable in-situ chelating agent generator. A problem associated with particles can be a lack of uniform distribution of the particles to all of the regions of the shale formation. By way of example, particles can have a tendency to coalesce in the treatment fluid, which can result in uneven distribution to the shale formation and in particular to fracture faces. In addition, the effectiveness of penetration of particles into microfractures will depend on the relative size of the particles and microfractures.

While the application of hydraulic fracturing allows for hydrocarbon production from very low permeability formations, it can be a costly process that has many technical and environmental drawbacks such as those noted above

SUMMARY OF THE INVENTION

A solution to the above problems associated with producing hydrocarbons from shale has been discovered. The solution is premised on introducing treatment fluids containing hydrolyzable precursor materials (e.g., hydrolyzable organic acid precursor(s) and/or hydrolyzable chelating agent precursor(s)) as delayed carbonate-dissolving agents into the microfractures of the shale formation. In particular embodiments, these precursor materials can be solubilized (e.g., partially, substantially, or completely solubilized) in the treatment fluid, which can provide for a more even distribution of the precursor materials throughout the treatment fluid and ultimately throughout the shale formation. Once hydrolyzed, the precursor materials can break down into organic acids and/or chelating agents and solubilize carbonate present in the shale formation, preferably carbonate present in the microfractures of the shale formation. This hydrolysis process can occur during or after treating a given shale formation, preferably within 24 hours after treatment begins. Dissolution of at least some of the carbonate may result in at least one of: (a) increased conductivity or permeability of the microfractures; (b) increased connectivity between microfractures and macrofractures; and/or (c) extension of natural fracture networks. This may be manifested as an increase in SRV, reduced decline rate, and/or improvement of the hydrocarbon recovery factor during secondary production such as waterflooding.

Additional non-limiting advantages offered by the present invention also include at least one of: (i) providing for a simple and effective process for maximising hydrocarbon production from shale formations which are widely considered to be "unconventional" reserves, particularly during primary and secondary production; (ii) providing for a process that is low hazard and environmentally acceptable by utilising components that are of low environmental impact; (iii) providing for a lower cost treatment process that complements hydraulic fracturing and that can provide increases in hydrocarbon recovery (either the rate of recovery or the hydrocarbon recovery factor) from shale formations in both primary and secondary recovery operations; (iv) dissolution of at least a portion of the carbonate present in shale, to as deep an extent as possible to maximise the region of the shale that is contributing to production; (v) dissolution of carbonate from the surface of fractures to provide heterogeneous surfaces that can keep un-propped fractures and microfractures open, so that they do not close during production. Dissolving carbonate in bedding planes or planes of weakness may also improve well productivity, for example by extending natural fracture networks; and/or (vi) removal of carbonate in a uniform manner, while avoiding over-treatment and excessive weakening of the shale formation.

In one particular embodiment, the present invention provides a process for enhancing hydrocarbon production from a shale formation that comprises carbonate material, which process comprises: (a) providing a treatment fluid that comprises a water soluble, delayed release carbonate-dissolving agent; (b) introducing the treatment fluid into the shale formation after or as part of a hydraulic fracturing process; and (c) allowing the water soluble, delayed release carbonate-dissolving agent to hydrolyze to produce organic acid or chelating agent to dissolve at least a portion of the carbonate material in the shale formation.

Also disclosed in the context of the present invention is a treatment fluid that comprises a water soluble, delayed release carbonate-dissolving agent and a shale inhibitor.

The phrase "delayed release carbonate-dissolving agent" encompasses a hydrolyzable compound that undergoes hydrolysis to produce an organic acid and/or a chelating agent. The produced organic acid and/or chelating agent is capable of dissolving at least a portion of carbonate material present in a shale formation. By comparison, the hydrolyzable (i.e., non-hydrolyzed) compound has reduced or no ability to dissolve carbonate when compared with the produced organic acid and/or chelating agent. Therefore, the hydrolyzable compound has a delayed release profile, the delay being hydrolysis into an organic acid and/or a chelating agent that is capable of dissolving carbonate material.

The term "about" or "approximately" are defined as being close to as understood by one of ordinary skill in the art. In one non-limiting embodiment the terms are defined to be within 10%, preferably within 5%, more preferably within 1%, and most preferably within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods and compositions of the present invention can "comprise," "consist essentially of," or "consist of" particular ingredients, components, compositions, etc. disclosed throughout the specification.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A goal of a successful shale stimulation process is to contact the greatest volume of rock per barrel pumped. Most hydraulic fracturing treatments pumped in "brittle" shale create very large and very complex fracture networks which expose a large amount of shale surface area. The vast shale volume affected enables flow at commercial production rates. Microfractures make a significant contribution to production, but induced un-propped fractures and microfractures may close during production of the well, resulting in a fall in production.

The process of the present invention, when applied to suitable candidate shales, will dissolve carbonate in natural and induced macrofractures and microfractures, particularly microfractures which intersect macrofractures. Compared to the situation where the process is not used, this will increase the conductivity or permeability or the microfractures in particular and may result in one or more of: (1) an initial improvement in the SRV; (2) a reduction in the proportion of microfractures closing during production and reducing the production rate; and/or (3) an increase in the hydrocarbon recovery factor, particularly during secondary recovery. The shale formation may, for example, have a permeability of less than 10 microdarcies, e.g. 8 microdarcies or less (such as 1-10 microdarcies) or even a permeability of 100 nanodarcies or less (e.g. 1-100 nanodarcies). Furthermore, the shale formation may, for example, have a porosity of 1-10%, such as 2-8%. The shale formation typically comprises carbonate material-containing microfractures and the process of the present invention serves to dissolve at least a portion of the carbonate material in these microfractures.

Where microfractures are partly blocked by carbonate, dissolution of the carbonate may result in an increase in the length of open microfractures and an increase in the SRV. Dissolution of carbonate in fractures within bedding planes may also assist production.

Dissolution of at least a portion of the carbonate present in shale provides a mechanism through which the SRV might be maximized around the time of initial hydraulic fracturing or by which hydrocarbon recovery might be increased, for example during water flooding.

In some shale formations, if there is sufficient injectivity available at below the fracture pressure, placing treatment fluids in the absence of a hydraulic fracturing treatment may enhance production from the shale formation.

It will be understood by those skilled in the art that the hydrocarbon recovery factor for conventional oil and gas reservoirs will depend on the effectiveness of a combination of primary recovery, secondary recovery (e.g., pressure maintenance by water injection) and Enhanced Oil Recovery (EOR) process applied, including thermal methods (e.g., steam methods), non-thermal methods including designer water, polymer flooding, alkali/surfactant/polymer (ASP) flooding, surfactant flooding, or miscible or immiscible gas flooding (Ref: http://www.spe.org/industry/increasing-hydrocarbon-recovery-factors.php).

In some preferred aspects of the present invention, the shale should contain sufficient carbonate with a distribution within the shale that will yield an improvement when at least part of the carbonate is dissolved, for example by providing sufficient heterogeneity that microfractures do not close during production, by improving the connection of microfractures to macrofractures, or increasing the effective length of microfractures by removing any carbonate which is blocking the microfracture.

Typically the carbonate material comprises one or more selected from the group consisting of calcium carbonate, magnesium carbonate, calcium magnesium carbonate, calcite, and dolomite.

In order to have a beneficial effect it may not be necessary to dissolve a large amount of carbonate. Removing small amounts of carbonate may be sufficient to remove bottlenecks to flow and improve the connectivity of microfractures to macrofractures.

Although the method of the present invention is directed at dissolving carbonate minerals present in shales, it is not outside of the intended scope of the present invention that other non-carbonate minerals present in the shales and which can be solubilised by the treatment fluids of the invention may also be dissolved and contribute to an improvement in the hydrocarbon recovery factor.

The process may be applied to very low permeability hydrocarbon-bearing formations commonly characterised as shales or mudstones and containing carbonate.

The process of the present invention is normally applied to suitable shale formations that are hydraulically fractured. The process can, for example, be contrasted with methods wherein a formation is treated prior to any hydraulic fracturing.

As indicated above, use of a reactive treatment fluid, such as HCl, even at low concentrations to dissolve carbonate, may result in "over-treatment" of shale near the point of introduction of the acid and "under-treatment" of shale by "spent" treatment fluid some distance from the point of introduction. This may be a particular problem in shale formations that contain a high carbonate content.

In some preferred instances, the process of the present invention does not use a reactive acid such as HCl, formic acid, or acetic acid in the treatment fluid to dissolve carbonate, but instead uses carbonate-dissolving agents which have a delayed action. However, a combination of carbonate-dissolving agents and reactive acid could be used in other aspects of the present invention. Preferred delayed carbonate-dissolving agents are organic acid precursors. Use of organic acid precursors permits organic acid to be generated in-situ after placement of the fluid, ensuring uniform delivery of organic acid for carbonate dissolution.

Producing organic acid in-situ from acid precursors, rather than using an organic or mineral acid directly, can deliver enhanced zonal coverage. In addition, the use of certain acid precursors offers considerable health, safety, and environmental advantages compared to the use of reactive mineral or organic acids.

Preferred acid precursors suitable for use in the process of the present invention include (but are not limited to) carboxylic acid esters. Suitable esters will be well known to those skilled in the art of in-situ acidizing. Preferred esters include, but are not limited to, esters of formic, acetic, glycolic and lactic acid with C1-C4 alcohols, ethylene glycol, diethylene glycol, and glycerol. Most preferred are esters of formic or acetic acid with diethylene glycol or glycerol. Such esters have a relatively high yield of acid, with the acid precursors and the products of acidizing all having good solubility in aqueous fluids.

The typical temperature range in which acetic, glycolic, and lactic acid precursors are used is from about 85° C. and preferably from about 100° C. up to about 160° C. Precursors of formic acid hydrolyse more readily than precursors of acetic glycolic or lactic acid, so can generate acid in-situ at lower temperatures. The typical temperature range in which precursors of formic acid are used is from about 30° C. to about 120° C.

Esters of sulphonic acid, a low pKa acid, are also recognised as potentially useful acid precursors and may be used in the process of the present invention.

Other organic acid precursor which may be employed in the process of the current invention are orthesters such as are well known to those skilled in the art of acidising, including but not being limited to, an orthoacetate, an orthoformate and orthoesters of a polyfunctional alcohol.

Other delayed carbonate-dissolving agents which may be used in the process of the present invention are precursors of chelating agents (chelating agent precursors). Suitable chelating agent precursors include but may not be limited to esters, amides and anhydrides of chelating agents. Such compounds may hydrolyse in solution to deliver active chelating agents capable of dissolving carbonate or other non-carbonate minerals present in the shale.

Esters of chelating agents such as malonic acid, oxalic acid, succinic acid, ethylenediaminetetraacetic acid (EDTA), nitriloacetic (NTA), citric acid, hydroxyacetic acid, glutamic acid N,N-diacetic acid (GLDA) or methylglycine N,N-diacetic acid (MGDA) to generate chelating agents has been taught in U.S. Pat. Nos. 6,702,023, 6,763,888 and WO 2012/113738, the contents of each of which are herein incorporated by reference in their entirety. If a base is present and the chelating acid is neutralised, it will be understood that salts of such chelating acids may also act as dissolving agents for acid soluble materials such as carbonate as taught in U.S. Pat. No. 7,021,377, the contents of which are herein incorporated by reference in their entirety. The use of amides and anhydrides of GLDA or MGDA has also been taught (see, for example, WO 2012/113738, the contents of which are herein incorporated by reference in their entirety).

Preferred chelating agents are low toxicity and readily biodegradeable.

Treatment formulations based on acid precursors are generally designed to deliver a certain amount of acid from the treatment fluid within a desired timescale at the prevailing temperature. The acid produced from the acid precursor is available to solubilise at least a portion of carbonate present in shale, which is then removed from the treated zone in the form of dissolved salts.

Similarly, treatment formulations based on chelating agent precursors are generally designed to deliver a certain amount of chelating agent from the treatment fluid within a desired timescale at the prevailing temperature. The chelating agent produced from the chelating agent precursor is available to solubilise at least a portion of carbonate present in shale, which is then removed from the treated zone in the form of dissolved chelates and salts.

In some instances, a combination of an organic acid precursor(s) and a precursor of a chelating agent(s) can be used to further maximize dissolution of carbonate.

Treatment fluids of the present invention may be prepared by any method known to one skilled in the art. Generally, the components may be mixed in any order.

It will be understood by those skilled in the art that treatment fluids used to treat underground formations typically need to be made up at a certain density.

It will also be understood by those skilled in the art that as shales typically contain clays, the treatment fluid may need to be formulated to prevent clay swelling, by for example including a minimum level of a salt such as KCl in the treatment formulation or other shale inhibitors such as will be well known to those skilled in the art, providing that they are compatible with the carbonate dissolving agents of the present invention.

It will also be understood by those skilled in the art that the delayed carbonate-dissolving agent, hydrolysis products and products of carbonate dissolution will also need to be sufficiently compatible with the shale. This will be taken into account when designing treatment formulations and treatments.

The treatment fluid is normally prepared by dissolving the components in a suitable carrier fluid, typically suitable water. Examples include city (drinking) water, produced water, sea water or oilfield brines, such as will be well known to those skilled in the art. The treatment fluid is therefore normally an aqueous treatment fluid, i.e., a treatment fluid that comprises water (e.g., at least 50 wt % water).

The concentration of delayed carbonate-dissolving agent in the treatment fluid will be sufficient to dissolve carbonate to increase the hydrocarbon recovery factor without adversely affecting the mechanical strength of the shale. In some cases this might be achievable in a single treatment, although more than one treatment may be used. The concentration of delayed carbonate-dissolving agent in the treatment fluid will typically be between 0.1% and 30% w/v, preferably between 0.5 and 10% w/v and most preferably between 1% and 5% w/v.

Normally, all components of the treatment fluid will be soluble in the treatment fluid at their concentration of use, i.e., they will be fully dissolved in the treatment fluid. The delayed release carbonate-dissolving agent in particular is a water-soluble substance. It is typically dissolved in the treatment fluid.

Typically the treatment fluid does not comprise an enzyme (i.e., it is a non-enzymatic treatment fluid). Typically the treatment fluid does not comprise bacteria (i.e., it is a non-bacterial treatment fluid). In an embodiment the treatment fluid may comprise no or substantially no particulate material. If the treatment fluid is used as part of a hydraulic fracturing process, it may contain proppant (e.g. proppant but no other particulate material).

If using a delayed carbonate-dissolving agent above the concentration at which it is fully soluble, it is not outside of the scope of the present invention that an emulsion or micro-emulsion of the delayed carbonate-dissolving agent may be used. For example 1,3-diacetyloxypropan-2-yl acetate, an ester of acetic acid, is soluble in water at about 5% w/v, so if used at 10%, it would need to be emulsified or micro-emulsified. In order for such emulsions or micro-emulsions to be effective in the process of the current invention, they would still need to be able to enter microfractures.

After preparing the treatment fluid, it is introduced into the target zone by any method known to those skilled in the art. This may include introduction into an underground formation, for example via the drill string, coiled tubing, work string, or by bullheading.

Preferably, the treatment fluid may be used as a fracturing fluid in one or more stages of the hydraulic fracturing process. In such cases it may be introduced into the shale formation at a pressure at or above the fracture pressure.

Alternatively, the treatment fluid is placed at below fracture pressure following a hydraulic fracturing operation.

The hydraulic fracturing process referred to in step (b) of the process of the present invention is preferably a propped hydraulic fracturing process, i.e., it preferably is carried out in the presence of a proppant.

In some cases, if the shale contains a sufficient number of natural fractures and/or microfractures with sufficient conductivity, it may be possible to forego the hydraulic fracturing operation and introduce the treatment fluid into the shale at a pressure less than the fracture pressure.

As indicated above, more than one treatment may be needed in order to achieve the primary objective of the treatment, which is to dissolve sufficient carbonate to increase the hydrocarbon recovery factor. If desired, one of the treatments may comprise use of the treatment fluid as a fracturing fluid.

Treatment formulations are designed to give acceptable rates of generation of organic acid and/or chelating agent for carbonate dissolution and therefore acceptable treatment (shut-in) times under the conditions of use.

Each treatment will be shut in for a period of time sufficient for the delayed carbonate-dissolving agent to produce the acid or chelating agent needed to dissolve carbonate or other non-carbonate minerals in the shale that may be amenable to dissolution by the organic acid or chelating agent. The shut in time required for individual acid precursors or chelating agent precursors will be well understood by those skilled in the art. In most cases the treatment fluids will be designed to dissolve carbonate within 24 hours, and ideally within less than 12 hours.

The volume of treatment fluid to be used will be appropriate to the needs of the treatment and will either be known to, or determinable by those skilled in the art of treating underground formations.

One or more treatments may be applied. More than one treatment may be used where more carbonate dissolution is desirable than can be achieved in a single treatment.

In most cases, it is desirable to avoid any excessive reduction in the mechanical strength of the shale, following application of an individual or multiple treatments. However, as long as the conductivity of fractures, including microfractures is maintained, some reduction in the mechanical strength will be acceptable.

In the simplest embodiment, the treatment fluids of the present invention will comprise water and a delayed carbonate-dissolving agent. Depending on the source of the water, salts may also be present. One or more salt may also be added for the purpose of clay control. It will be understood by those skilled in the art of oilfield chemistry that dissolution of carbonate and rocks may result in the release of ions such as iron (II) and iron (III) that have the potential to form precipitates. In such cases, additional components such as iron control agents or chelating agents may also be added to the treatment fluid, if iron control functionality is not already being provided by the organic acid or chelating agent generated from the delayed carbonate-dissolving agent. Suitable iron control and chelating agents will be well known to those skilled in the art.

Optionally, the treatment fluids of the present invention may also contain other chemical additives such as are often added to oilfield chemical treatment formulations, including, but not being limited to; shale inhibitors, corrosion inhibitors, viscosifying agents, surfactants, foaming agents, biostatic agents and biocidal agents. The need for any such additive in particular treatment circumstances will be understood by those skilled in the art. All components of the treatment fluid should be compatible with each other in the formulated treatment fluid and also in the "spent" treatment fluid. If using the treatment fluids as a fracturing fluid, the properties of the formulated fluid will need to be suitable for fracturing.

Where an organic acid precursor is used as the delayed carbonate-dissolving agent, and it is desirable to also dissolve clay or silicate components of shale, a suitable hydrogen fluoride (HF) precursor such as ammonium bifluoride may also be added to the treatment fluid. Other suitable hydrogen fluoride precursors, such as will be known to those skilled in the art of HF acidizing may also be used. As organic acid is produced from the organic acid precursor, hydrogen fluoride will be produced allowing the dissolution of a portion of clays or silicate materials present in the shale. As will be known to those skilled in the art, care will need to be taken to avoid precipitation of calcium fluoride. The use of suitable chelating agents or chelating agent precursors will reduce this risk.

All chemicals used in the process of the present invention will normally be technical grade to reduce the cost of the process.

The present invention can have at least one or any combination of or all of the following particular advantages over the prior art:

More uniform and deeper dissolution of carbonate from shale formations can be achieved using delayed carbonate-dissolving agents than can be achieved using HCl. It is more likely carbonate can be removed more uniformly from the SRV and the size of the SRV may be increased.

More uniform removal of carbonate may increase the hydrocarbon recovery factor.

It is less likely that "over-treatment" may occur, resulting in too large a reduction in the mechanical strength of the shale with the adverse consequences which may result from this.

In some embodiments, application of the process may allow production of oil or gas at economic rates from shales without the need for re-fracturing, or even without any hydraulic fracturing at all.

In at least some embodiments of the invention, all of the components of the treatment fluids are generally environmentally acceptable and of low environmental impact. This potentially makes the system much more suitable for use in sensitive environments, for example arctic environments.

The present technology also provides use of a treatment fluid as defined herein in a process as defined herein. For example, the present technology provides use of a treatment fluid for enhancing hydrocarbon production from a shale formation that comprises carbonate material, in a process which comprises: (a) providing a treatment fluid that comprises a water soluble, delayed release carbonate-dissolving agent; (b) introducing the treatment fluid into the shale formation after or as part of a hydraulic fracturing process; and (c) allowing the water soluble, delayed release carbonate-dissolving agent to hydrolyze to produce organic acid or chelating agent to dissolve at least a portion of the carbonate material in the shale formation. Alternatively, or additionally the use is use of a treatment fluid for at least one of; (i) improving initial SRV; (ii) reducing the proportion of microfractures closing during production and reducing the production rate; and/or (iii) increasing the hydrocarbon recovery factor, particularly during secondary recovery.

The following [1] to [22] and [A] to [N] are further aspects of the present technology. For the avoidance of doubt, these aspects can be combined with other features set out in the foregoing disclosure.

[1] A process for enhancing hydrocarbon production from a shale formation that comprises carbonate material, which process comprises: (a) providing a treatment fluid that comprises a water soluble, delayed release carbonate-dissolving agent; (b) introducing the treatment fluid into the shale formation after or as part of a hydraulic fracturing process; and (c) allowing the water soluble, delayed release carbonate-dissolving agent to hydrolyze to produce an organic acid or a chelating agent to dissolve at least a portion of the carbonate material in the shale formation.

[2] A process according to [1] wherein the water soluble, delayed release carbonate-dissolving agent is selected from at least one of the group consisting of an acid precursor and a chelating agent precursor.

[3] A process according to [2] wherein the acid precursor is selected from at least one of the group consisting of an ester and an orthoester.

[4] A process according to [3] wherein the ester is selected from at least one of the group consisting of an ester of formic acid, acetic acid, glycolic acid, and lactic acid and wherein the orthoester is selected from the group consisting of an orthoacetate, an orthoformate and an orthoester of a polyfunctional alcohol.

[5] A process according to any one of [1] to [4] wherein the carbonate material comprises one or more selected from the group consisting of calcium carbonate, magnesium carbonate, calcium magnesium carbonate, calcite and dolomite.

[6] A process according to any one of [1] to [5] wherein the concentration of the non-enzymatic, delayed release carbonate-dissolving agent in the treatment fluid is selected from the group consisting of: (a) between 0.1% and 30% w/v; (b) between 0.5% and 10% w/v; and (c) between 1.0% and 5% w/v.

[7] A process according to any one of [1] to [6] wherein the treatment fluid is placed at a pressure below fracture pressure.

[8] A process according to any one of [1] to [6] wherein the treatment fluid is placed at a pressure at or above fracture pressure.

[9] A process according to [8] wherein the treatment fluid is used as one or more stages in a hydraulic fracturing process.

[10] A process according to any one of [1] to [9] wherein the water soluble, delayed release carbonate-dissolving agent comprises an acid precursor, the treatment fluid further comprises a hydrogen fluoride precursor and the acid produced by hydrolysis of the acid precursor leads to the generation of hydrogen fluoride from the hydrogen fluoride precursor.

[11] A process according to any one of [1] to [10] wherein the treatment fluid further comprises at least one chemical additive selected from at least one of the group consisting of shale inhibitors, iron control agents, chelating agents, corrosion inhibitors, viscosifying agents, surfactants, foaming agents, biostatic agents, and biocidal agents.

[12] A process according to any one of [1] to [11] wherein the process extends the microfracture networks formed by the hydraulic fracturing process.

[13] A treatment fluid as defined in any one of [1] to [11] that comprises a water soluble, delayed release carbonate-dissolving agent and a shale inhibitor.

[14] A process for enhancing hydrocarbon production from a shale formation that comprises carbonate material, which process comprises: (a) providing a treatment fluid that comprises a water soluble, delayed release carbonate-dissolving agent; (b) introducing the treatment fluid into the shale formation; and (c) allowing the water soluble, delayed release carbonate-dissolving agent to hydrolyze to produce organic acid or chelating agent to dissolve at least a portion of the carbonate material in the shale formation.

[15] A process according to [14] wherein the water soluble, delayed release carbonate-dissolving agent is selected from at least one of the group consisting of an acid precursor and a chelating agent precursor.

[16] A process according to [15] wherein the acid precursor is selected from at least one of the group consisting of an ester and an orthoester.

[17] A process according to [16] wherein the ester is selected from at least one of the group consisting of an ester of formic acid, acetic acid, glycolic acid and lactic acid and wherein the orthoester is selected from at least one of the group consisting of an orthoacetate, an orthoformate, and an orthoester of a polyfunctional alcohol.

[18] A process according to any one of [14] to [17] wherein the carbonate material comprises one or more selected from the group consisting of calcium carbonate, magnesium carbonate, calcium magnesium carbonate, calcite, and dolomite.

[19] A process according to any one of [14] to [18] wherein the concentration of the non-enzymatic, delayed release carbonate-dissolving agent in the treatment fluid is selected from the group consisting of: (a) between 0.1% and 30% w/v; (b) between 0.5% and 10% w/v; and (c) between 1.0% and 5% w/v.

[20] A process according to any one of [14] to [19] wherein the treatment fluid is placed at a pressure below fracture pressure.

[21] A process according to any one of [14] to [20] wherein the water soluble, delayed release carbonate-dissolving agent comprises an acid precursor, the treatment fluid further comprises a hydrogen fluoride precursor and the acid produced by hydrolysis of the acid precursor leads to the generation of hydrogen fluoride from the hydrogen fluoride precursor.

[22] A process according to any one of [14] to [21] wherein the treatment fluid further comprises at least one chemical additive selected from at least one of the group consisting of shale inhibitors, iron control agents, chelating agents, corrosion inhibitors, viscosifying agents, surfactants, foaming agents, biostatic agents, and biocidal agents.

[A] A process for enhancing hydrocarbon production from a shale formation that comprises carbonate material, which process comprises: (a) providing a treatment fluid that comprises a water soluble, delayed release carbonate-dissolving agent; (b) introducing the treatment fluid into the shale formation after or as part of a hydraulic fracturing process; and (c) allowing the water soluble, delayed release carbonate-dissolving agent to hydrolyze to produce an organic acid and/or a chelating agent to dissolve at least a portion of the carbonate material in the shale formation.

[B] The process according to [A], wherein the water soluble, delayed release carbonate-dissolving agent is at least one selected from the group consisting of an acid precursor and a chelating agent precursor.

[C] The process according to [B], wherein the acid precursor is at least one selected from the group consisting of an ester and an orthoester.

[D] The process according to [C], wherein the ester is at least one selected from the group consisting of an ester of formic acid, acetic acid, glycolic acid, and lactic acid, and wherein the orthoester is selected from the group consisting of an orthoacetate, an orthoformate, and an orthoester of a polyfunctional alcohol.

[E] The process according to [B], wherein the water soluble, delayed release carbonate-dissolving agent comprises an acid precursor, the treatment fluid further comprises a hydrogen fluoride precursor and the acid produced by hydrolysis of the acid precursor leads to the generation of hydrogen fluoride from the hydrogen fluoride precursor.

[F] The process according to [A], wherein the carbonate material comprises one or more selected from the group consisting of calcium carbonate, magnesium carbonate, calcium magnesium carbonate, calcite, and dolomite.

[G] The process according to [A], wherein the concentration of the non-enzymatic, delayed release carbonate-dissolving agent in the treatment fluid is selected from the group consisting of: (a) between 0.1% and 30% w/v; (b) between 0.5% and 10% w/v; and (c) between 1.0% and 5% w/v.

[H] The process according to [A], wherein the treatment fluid is placed at a pressure below fracture pressure.

[I] The process according to [A], wherein the treatment fluid is placed at a pressure at or above fracture pressure.

[J] The process according to [I], wherein the treatment fluid is used as one or more stages in a hydraulic fracturing process.

[K] The process according to [A], wherein the treatment fluid further comprises at least one chemical additive selected from the group consisting of shale inhibitors, iron control agents, chelating agents, corrosion inhibitors, viscosifying agents, surfactants, foaming agents, biostatic agents, and biocidal agents.

[L] The process according to [A], wherein the process extends microfracture networks formed by the hydraulic fracturing process.

[M] A treatment fluid comprising a water soluble, delayed release carbonate-dissolving agent and a shale inhibitor.

[N] A process for enhancing hydrocarbon production from a shale formation that comprises carbonate material, which process comprises: (a) providing a treatment fluid that comprises a water soluble delayed release carbonate-dissolving agent; (b) introducing the treatment fluid into the shale formation; and (c) allowing the water soluble delayed release carbonate-dissolving agent to hydrolyze to produce an organic acid or a chelating agent to dissolve at least a portion of the carbonate material in the shale formation.

EXAMPLES

Example 1

Shale formations are typically deep and thus quite hot. For example, the Haynesville shale has been reported to have a temperature in the range of 260 to 380° F. (127 to 193° C.). The Barnett shale has been reported to have a temperature in the range 190 to 280° F. (88 to 138° C.) in the oil zone and 280 to 330° F. (138 to 166° C.) in the gas zone, and the Eagle Ford Shale is reported to have a temperature of between 250 to 325° F. (121-150° C.).

To assess the suitability of a commercially available acetic acid precursor (Acidgen HA, available from Cleansorb Limited) for dissolving carbonate in the range 93 to 131° C., a 10% w/v solution was placed in HPHT cells containing an excess of calcium carbonate powder (50 micron) at room temperature. The cells were closed, then rapidly heated to 93, 114 or 131° C. (199, 237 and 268° F.) and kept at this temperature for 6 hours, before cooling rapidly and samples of fluid being taken for analysis.

The acetic acid precursor hydrolysed to acetic acid, which dissolved calcium carbonate to release soluble calcium. The concentration of soluble calcium (mM) released after 6 hours at each temperature was measured using a colorimetric assay, allowing the percentage hydrolysis of the acid precursor at 6 hours to be calculated (percentage of maximum acid yield). Results are shown in Table 1.

TABLE 1

| Temp (° C.) | Temp (° F.) | mM Ca released after 6 hours | Percentage hydrolysis of acid precursor |
|---|---|---|---|
| 93 | 199 | 76 | 13 |
| 114 | 237 | 191 | 34 |
| 131 | 268 | 266 | 47 |

It can be seen that in the temperature range 93 to 131° C. (199 to 268° F.) over a six hour period, between 13 and 47% of the acid precursor was converted to acid and dissolved carbonate. Using this specific organic acid precursor, it can be seen that in this temperature range, including temperatures typical of shale formations, there is ample time for a treatment fluid to be placed in the formation, to generate acid in-situ and dissolve carbonate over a period of about 12 hours to 48 hours.

It will be understood by those skilled in the art that other acid precursors or delayed carbonate dissolving agents may hydrolyse at different rates (for example may have a slower or faster hydrolysis rate) and can be selected according to the requirements of a particular treatment for placement time and treatment duration.

Example 2

In determining the suitability of the process of the present invention for treatment of individual shales, the presence of carbonate in the shale and the amount of carbonate present is normally already known or can readily be determined. The amount and types of clay present and therefore the expected tendency of the shale for swelling is also known or readily determinable.

With knowledge of the expected shale swelling tendency, suitable shale inhibitors are selected, if considered necessary.

The compatibility of the treatment fluids with the shale are readily determined by examining the extent of any shale swelling in appropriate tests, such as those set out in SPE 121334.

Treatment fluids are designed to have a particular carbonate dissolving capacity when the delayed carbonate dissolving agent is fully hydrolysed. The dissolving capacity of individual delayed carbonate dissolving agents (for example grams of calcium carbonate per gram of delayed carbonate dissolving agent) is known or readily calculable.

Changes to the permeability and porosity of cores cut from the shale are readily investigated by standard core testing.

The amount of carbonate removed is readily determined by weight loss determinations or measurements of soluble calcium. Treatment of shale cores with suitable treatment fluids results in dissolution of at least a portion of the carbonate that is initially present and an increase in the permeability and porosity.

The effect of imbibition on hydrocarbon recovery factor during waterflooding following carbonate removal is readily determined by tests conducted using spontaneous imbibition cells. An increase in hydrocarbon recovery factor is observed.

Ultimately, the effectiveness of the treatment on particular shales is determined via conducting field treatments in candidate shales. Production rate, SRV, and/or hydrocarbon recovery factor data is collected from field treatments using a delayed carbonate dissolving agent and compared to the results of treatments conducted without a delayed carbonate dissolving agent. Improvements in production rate, SRV, and/or hydrocarbon recovery factor are obtained.

In common with other new shale or oilfield treatments, the process is susceptible to optimisation via an iterative process (CSUG/SPE 133874. Chong K. K. et al. (2010); A completions guide book to shale-play development; A review of successful approached towards shale-play stimulation in the last two decades). The results of initial field treatments are considered and the treatments adjusted accordingly. For example, there may be adjustment made to the treatment volume, concentration of delayed carbonate dissolving agent or additives employed.

The invention claimed is:

1. A process for enhancing hydrocarbon production from a shale formation that comprises carbonate material, which process comprises:
   providing a treatment fluid that comprises a water soluble, delayed release carbonate-dissolving agent that is dissolved in the treatment fluid, wherein the treatment fluid contains no particulate material, and wherein the treatment fluid comprises a shale inhibitor;
   introducing the treatment fluid into the shale formation
   generating an organic acid or a chelating agent within the shale formation at or near microfractures by hydrolysis of the water soluble, delayed release carbonate-dissolving agent; and
   dissolving at least a portion of the carbonate material in microfractures comprised within the shale formation with the organic acid or the chelating agent.

2. The process according to claim 1, wherein the water soluble, delayed release carbonate-dissolving agent is at least one selected from the group consisting of an acid precursor and a chelating agent precursor.

3. The process according to claim 2, wherein the acid precursor is at least one selected from the group consisting of an ester and an orthoester.

4. The process according to claim 3, wherein the ester is at least one selected from the group consisting of an ester of formic acid, acetic acid, glycolic acid, and lactic acid, and wherein the orthoester is selected from the group consisting of an orthoacetate, an orthoformate, and an orthoester of a polyfunctional alcohol.

5. The process according to claim 2, wherein the water soluble, delayed release carbonate-dissolving agent comprises an acid precursor, the treatment fluid further comprises a hydrogen fluoride precursor and the acid produced by hydrolysis of the acid precursor leads to the generation of hydrogen fluoride from the hydrogen fluoride precursor.

6. The process according to claim 1, wherein the carbonate material comprises one or more compounds selected from the group consisting of calcium carbonate, magnesium carbonate, calcium magnesium carbonate, calcite, and dolomite.

7. The process according to claim 1, wherein the concentration of the delayed release carbonate-dissolving agent in the treatment fluid is selected from the group consisting of: (a) between 0.1% and 30% w/v; (b) between 0.5% and 10% w/v; and (c) between 1.0% and 5% w/v.

8. The process according to claim 1, wherein the treatment fluid further comprises at least one chemical additive selected from the group consisting of iron control agents, chelating agents, corrosion inhibitors, viscosifying agents, surfactants, foaming agents, biostatic agents, and biocidal agents.

9. The process according to claim 1, wherein the shale formation is selected from the group consisting of: (i) a shale gas formation having a permeability of 1-100 nanodarcies and a porosity of 3-10%; and (ii) a shale oil formation having a permeability of 1-10 microdarcies and a porosity of 5-10%.

10. The process according to claim 1, wherein the shale formation is a shale gas formation having a permeability of 1-100 nanodarcies and a porosity of 3-10%.

11. The process according to claim 1, wherein the shale formation is a shale oil formation having a permeability of 1-10 microdarcies and a porosity of 5-10%.

12. The process according to claim 1, wherein the step (c) is performed at the prevailing temperature of the shale formation.

13. The process according to claim 1, wherein the water soluble, delayed release carbonate-dissolving agent comprises a chelating agent precursor.

14. The process according to claim 13, wherein the chelating agent precursor comprises at least one of an amide of a chelating agent and an anhydride of a chelating agent.

15. The process according to claim 1, wherein said introducing the treatment fluid into the shale formation is introducing the treatment fluid into the shale formation at below fracture pressure following the completion of a hydraulic fracturing operation.

16. The process according to claim 15, wherein the process extends microfracture networks formed by the hydraulic fracturing process.

* * * * *